(12) United States Patent
Gill

(10) Patent No.: US 8,818,155 B2
(45) Date of Patent: Aug. 26, 2014

(54) PLANAR WAVEGUIDE PRISM LENS

(75) Inventor: Douglas M. Gill, South Orange, NJ (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 13/606,390

(22) Filed: Sep. 7, 2012

(65) Prior Publication Data

US 2014/0072267 A1 Mar. 13, 2014

(51) Int. Cl.
*G02B 6/10* (2006.01)

(52) U.S. Cl.
USPC .......................................................... 385/129

(58) Field of Classification Search
USPC .................................... 385/129, 33
See application file for complete search history.

(56) References Cited

U.S. PATENT DOCUMENTS

| 5,017,783 | A * | 5/1991 | Mousavi | ....................... 250/353 |
| 6,594,409 | B2 | 7/2003 | Dutt et al. | |
| 6,823,112 | B2 | 11/2004 | Deliwala | |
| 7,187,837 | B2 | 3/2007 | Gothoskar et al. | |
| 7,929,814 | B2 | 4/2011 | Gothoskar et al. | |
| 7,964,981 | B2 | 6/2011 | Tsao | |
| 2004/0258348 | A1 * | 12/2004 | Deliwala | ....................... 385/14 |
| 2009/0316275 | A1 | 12/2009 | Baugh | |

OTHER PUBLICATIONS

Horst, F., et al., "Echelle grating WDM (de-)multiplexers in SOI technology, based on a design with two stigmatic points," Proc. of SPIE, vol. 6996, 2008, 69960R, 8 pages.
Horst, F., et al., "Silicon-on-Insulator Echelle Grating WDM Demultiplexers With Two Stigmatic Points," IEEE Photonics Technology Letters, vol. 21, Issue:23, Dec. 1, 2009, pp. 1743-1745.
Janz et al., "Planar waveguide echelle gratings in silica-on-silicon," IEEE Photonics Technology Letters, vol. 16, Issue 2, Feb. 2004, pp. 503-505.
Van Acoleyen, K. et al., "Compact lens-assisted focusing tapers fabricated on silicon-on-insulator," 2011 8th IEEE International Conference on Group Iv Photonics (GFP), Sep. 14-16, 2011, pp. 157-159.

* cited by examiner

*Primary Examiner* — Uyen Chau N Le
*Assistant Examiner* — Kajli Prince
(74) *Attorney, Agent, or Firm* — Cantor Colburn LLP; Vazken Alexanian

(57) ABSTRACT

An optical waveguide system includes a substrate, a cladding layer arranged on the substrate, a core layer arranged on the cladding layer, and a lens-prism patterned in the core material, the lens-prism comprising a Fresnel lens portion, and a Fresnel prism portion.

10 Claims, 10 Drawing Sheets

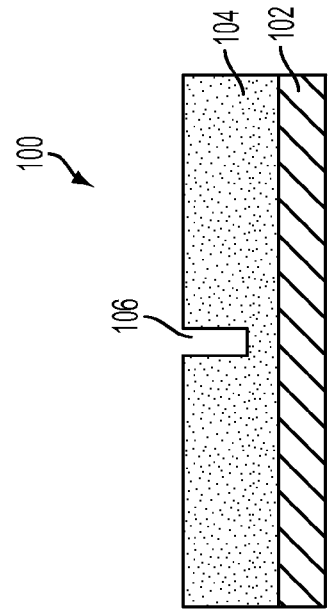
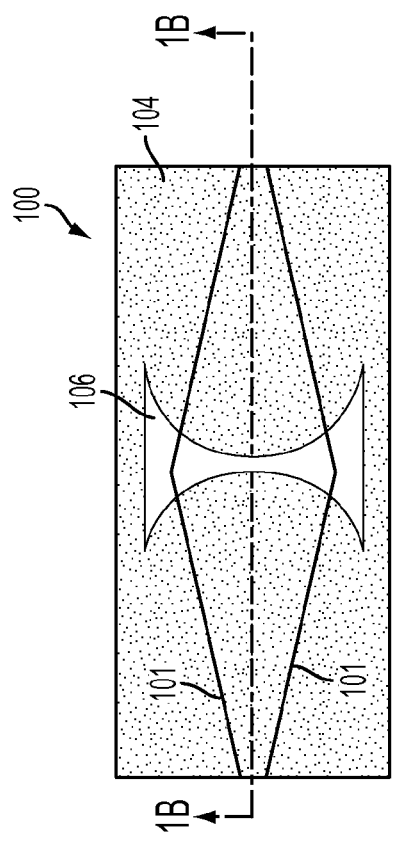
FIG. 1A
PRIOR ART
FIG. 1B
PRIOR ART
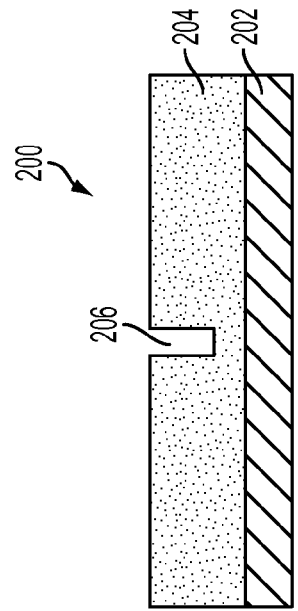
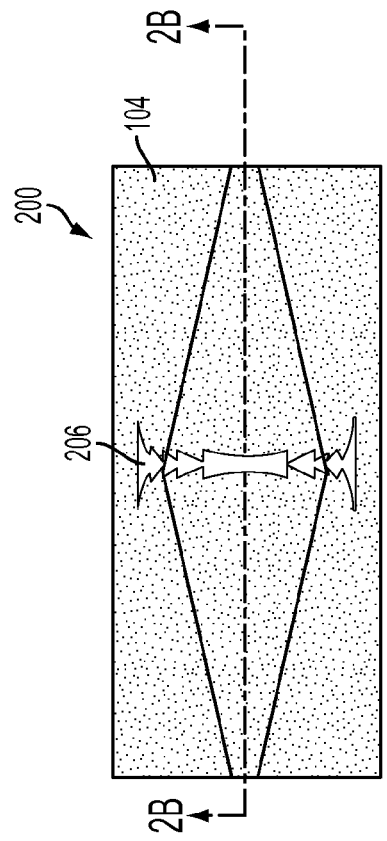
FIG. 2A
PRIOR ART
FIG. 2B
PRIOR ART

PLANAR WAVEGUIDE PRISM LENS

FIELD OF INVENTION

The present invention relates generally to planar waveguides, and more specifically, to prism lenses.

DESCRIPTION OF RELATED ART

Previous planar wave guides included two-dimensional planar waveguide lenses that were operative to focus a light source passing through the lens. Prisms have also been used to steer light sources and provide optical filtering for multi-wavelength applications, where a plurality of channels each having a different wavelength is provided by one or more light sources. The difference in wavelengths of each channel determines the effect of the lenses and prisms on each channel. Thus, individual channels may be steered in different directions by using a prism.

BRIEF SUMMARY

According to one embodiment of the present invention, an optical waveguide system includes a substrate, a cladding layer arranged on the substrate, a core layer arranged on the cladding layer, and a lens-prism patterned in the core material, the lens-prism comprising a Fresnel lens portion, and a Fresnel prism portion.

According to another embodiment of the present invention, a lens-prism comprising a Fresnel lens portion, and a Fresnel prism portion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 1A and 1B illustrate a prior art example of a waveguiding system. FIG. 1A illustrates a top view of the waveguide and FIG. 1B illustrates a cross-sectional view of the waveguide along the line 1B of FIG. 1A.

FIGS. 2A and 2B illustrate a prior art example of a waveguiding system.

FIG. 2A illustrates a top view of the waveguide and FIG. 2B illustrates a cross-sectional view of the waveguide along the line 2B of FIG. 2A.

DETAILED DESCRIPTION

Figure 3:
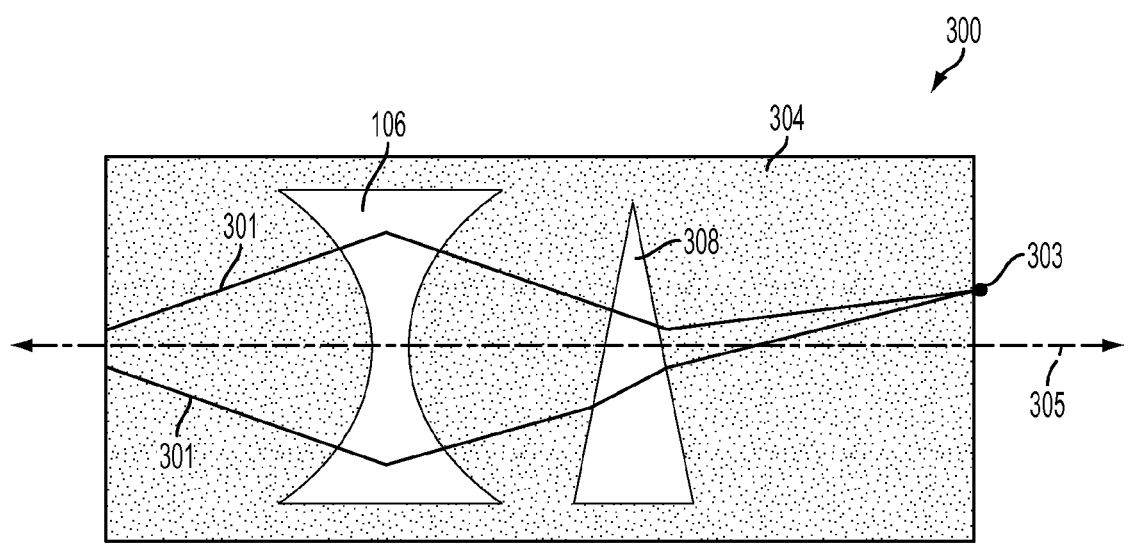
FIG. 3 illustrates an exemplary embodiment of a planar waveguide.

FIG. 1 illustrates a prior art example of a planar waveguiding system 100. FIG. 1A illustrates a top view of the waveguide 100 and FIG. 1B illustrates a cross-sectional view of the waveguide 100 along the line 1B of FIG. 1A. In this regard, the waveguide 100 is a planar waveguide that may include a substrate portion 102 and a core portion 104 disposed on the substrate portion 104. The substrate portion 102 may include, for example a semiconductor material, and the core portion 104 may include, for example, a semiconductor material, dielectric material or film. In the illustrated example, a biconcave lens portion 106 is patterned in the core portion 104. The biconcave lens portion 106 is operative to focus a light beam illustrated by the lines 101.

FIG. 2 illustrates a prior art example of a waveguide 200. FIG. 2A illustrates a top view of the waveguide 200 and FIG. 2B illustrates a cross-sectional view of the waveguide 200 along the line 2B of FIG. 2A. The waveguide 200 is similar to the waveguide 100 described above and includes a Fresnel lens portion 206 having a plurality of concentric annular sections (Fresnel zones). The Fresnel lens portion 206 induces a similar focusing effect as the biconcave lens portion 106 however; the Fresnel zones of the Fresnel lens portion 206 facilitate a reduction in the volume of the Fresnel lens portion 206 as opposed to the biconcave lens portion 106.

FIG. 3 illustrates an exemplary embodiment of a waveguide 300. The waveguide 300 includes a concave lens portion 106 and a prism portion 308 patterned in the core portion 304. The prism portion 308 is operative to refract the light beam indicated by the lines 301 to a point 303 that is off the longitudinal axis 305.

Figure 4:
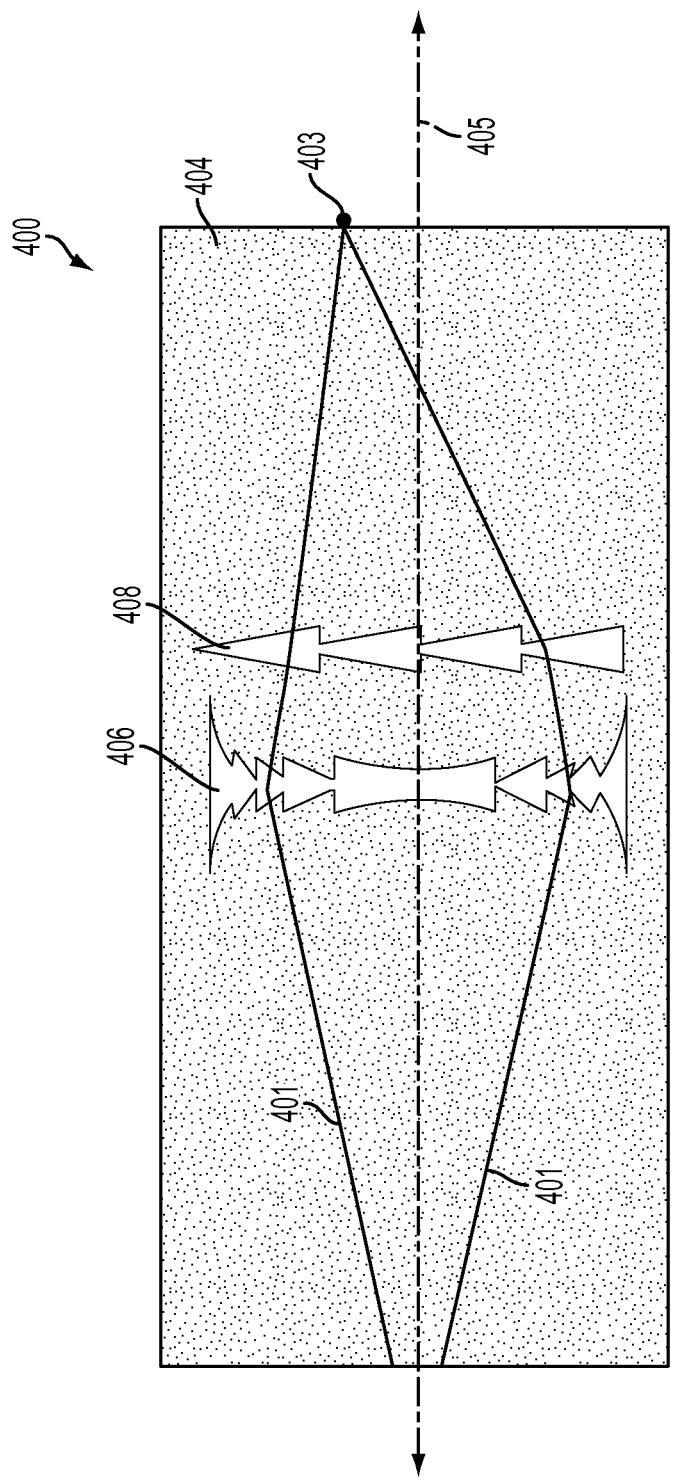
FIG. 4 illustrates an exemplary embodiment of a planar waveguide.

FIG. 4 illustrates an exemplary embodiment of a planar waveguide 400 that includes a core material 404 arranged on a substrate (not shown). In this regard, the waveguide 400 includes a Fresnel lens portion 406 and a Fresnel prism portion 408 patterned in the core material 404. The Fresnel prism portion 408 is operative to refract the light beam indicated by the lines 401 to the point 403 that is off the longitudinal axis 405 of the arrangement. The Fresnel prism portion 408 includes a plurality of zones that affect the light beam in a similar manner as a triangular prism however; the Fresnel prism portion consumes less planar area and volume than a triangular prism.

Figure 5A:
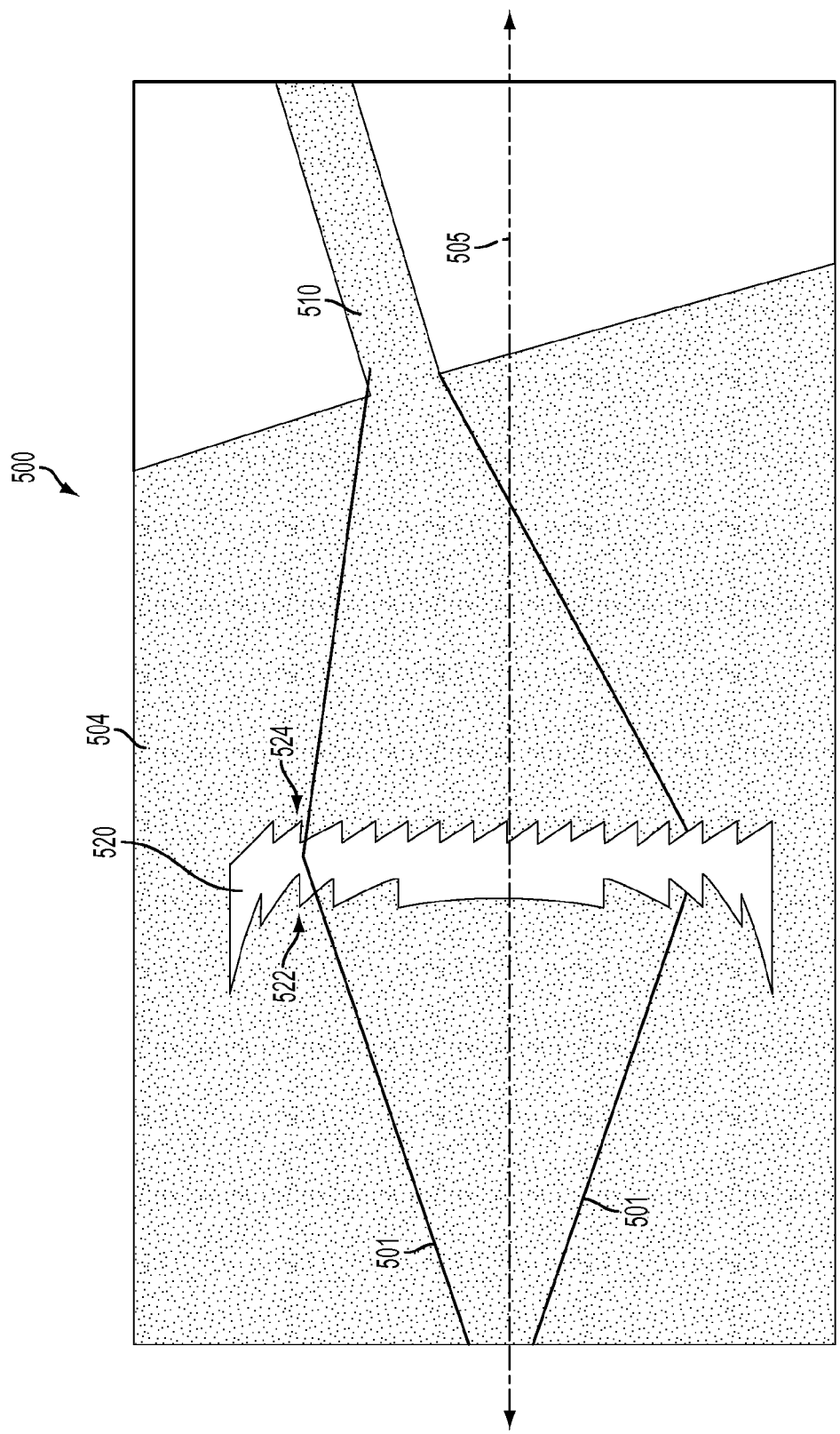
FIG. 5A illustrates a top view of an exemplary embodiment of a planar waveguide.
Figure 5B:
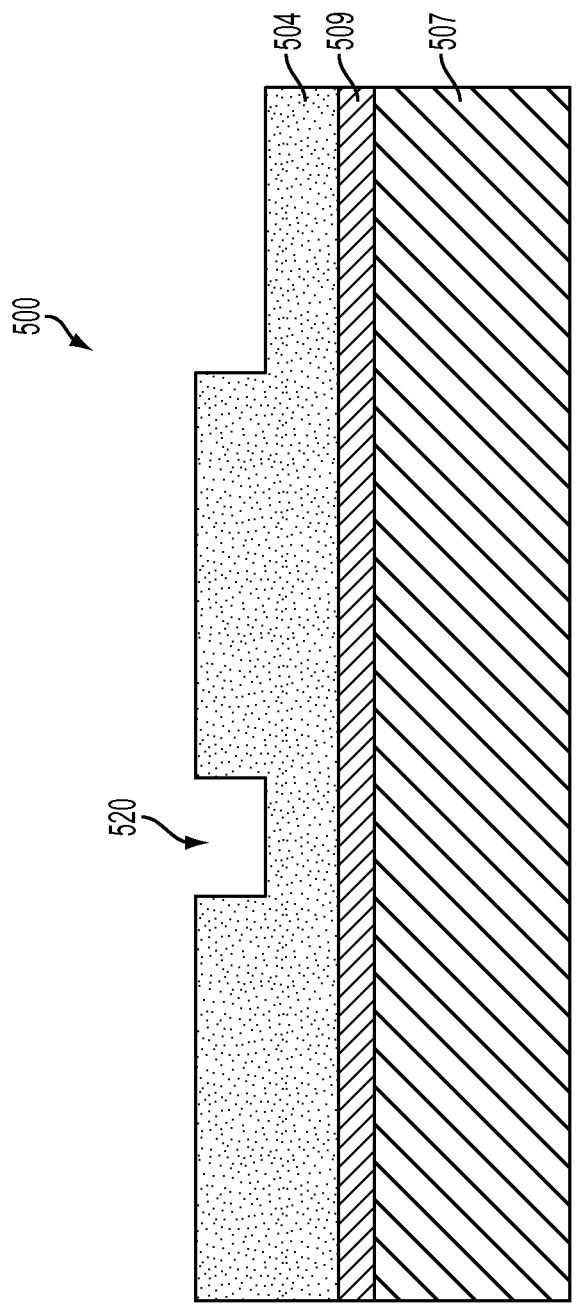
FIG. 5B illustrates a side cut-away view of the planar waveguide along the line 505 of FIG. 5A.

FIG. 5A illustrates a top view of an exemplary embodiment of a planar waveguide 500 that includes a lens-prism 520 having a Fresnel lens portion 522 and a Fresnel prism portion 524 arranged on opposing sides of the lens-prism 520. The lens-prism 520 is patterned in a core material 504 and defines a cavity arranged on a substrate (described below). In this regard, the arrangement of the lens-prism 520 provides benefits of focusing the light beam indicated by the lines 501 and diffracting the light beam to a desired point that may be off the lens axis 505. In the illustrated embodiment, the light beam is directed towards a waveguide portion 510. In alternate embodiments, the light beam may be directed towards another point or position such as, for example an impingement surface of a photodetector. FIG. 5B illustrates a side cut-away view of the planar waveguide 500 along the line 505

(of FIG. 5A). In this regard, the waveguide 500 includes a substrate 507 and a cladding layer 509 arranged on the substrate 507. The substrate 507 may include, for example, a silicon material, and the cladding layer 509 may include an oxide material. The core material 504 is arranged on the cladding layer 509. A second cladding layer (not shown) similar to the cladding layer 509, may be arranged on the core material 504 if desired, a second cladding layer may include any suitable material with an appropriate refractive index.

Figure 6:
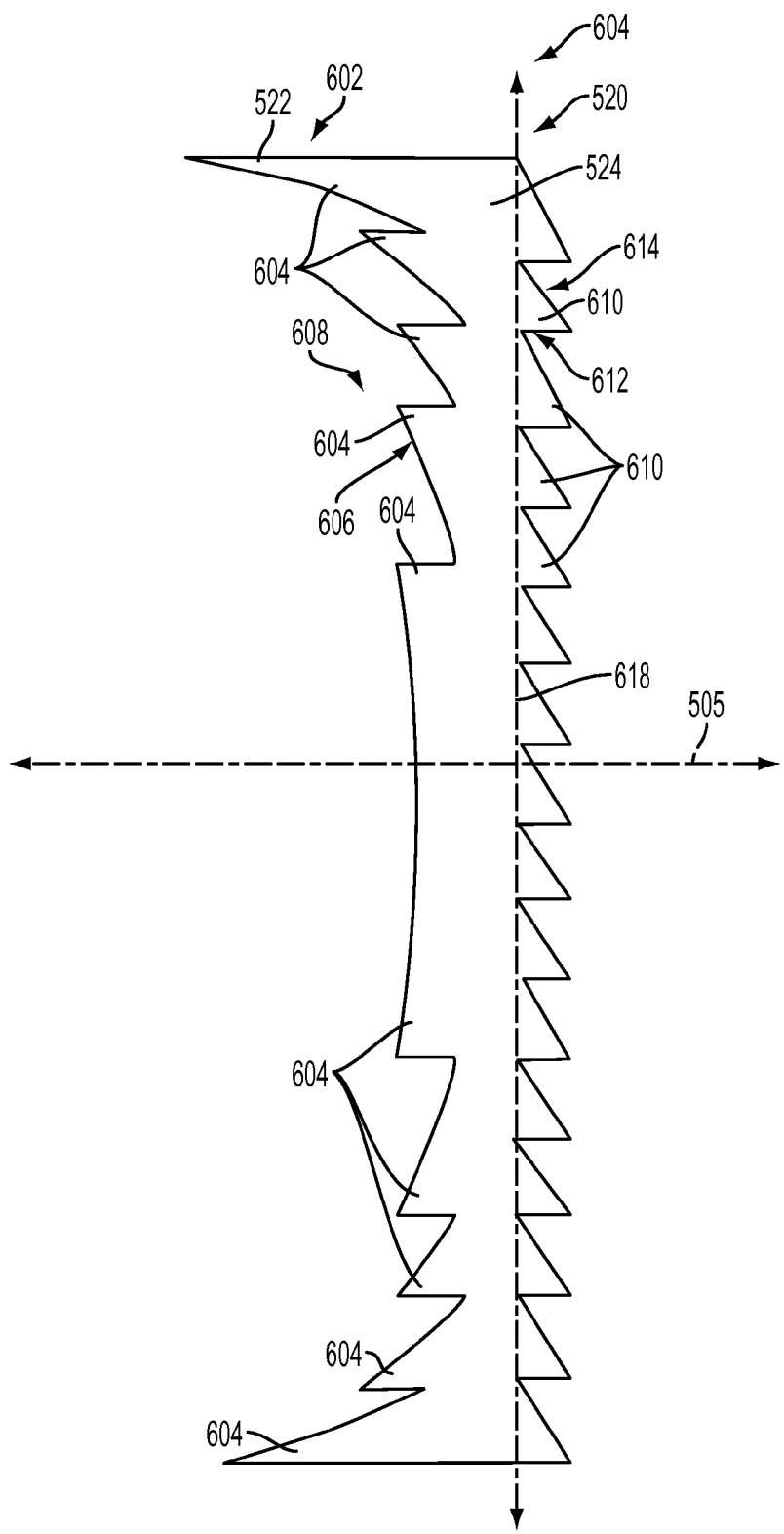
FIG. 6 illustrates a top view of the lens-prism of FIG. 5.

FIG. 6 illustrates a top view of the lens-prism 520. The Fresnel lens portion 522 is arranged on a first side 602 of the lens-prism 520. The Fresnel lens portion 522 includes a plurality of Fresnel zones 604 each having a concave concentric annular surface 606 and a substantially planar surface 608 arranged substantially in parallel with the lens axis 505. The Fresnel prism portion 524 includes a plurality of Fresnel zones 610 each having a first planar surface 612 arranged substantially parallel to the lens axis 505 and a second planar surface 614 arranged at an oblique angle relative to the lens axis 505. The lens-prism 520 includes a body region 618 that provides a transition or gap between the Fresnel lens portion 522 and the Fresnel prism portion 524. The Fresnel lens portion 522 and the Fresnel prism portion 524 extend outwardly in opposing directions from the body region 618. The lens-prism 520 is operative to focus and refract beams while consuming less surface area and volume than previous lens and prism arrangements.

Figure 7:
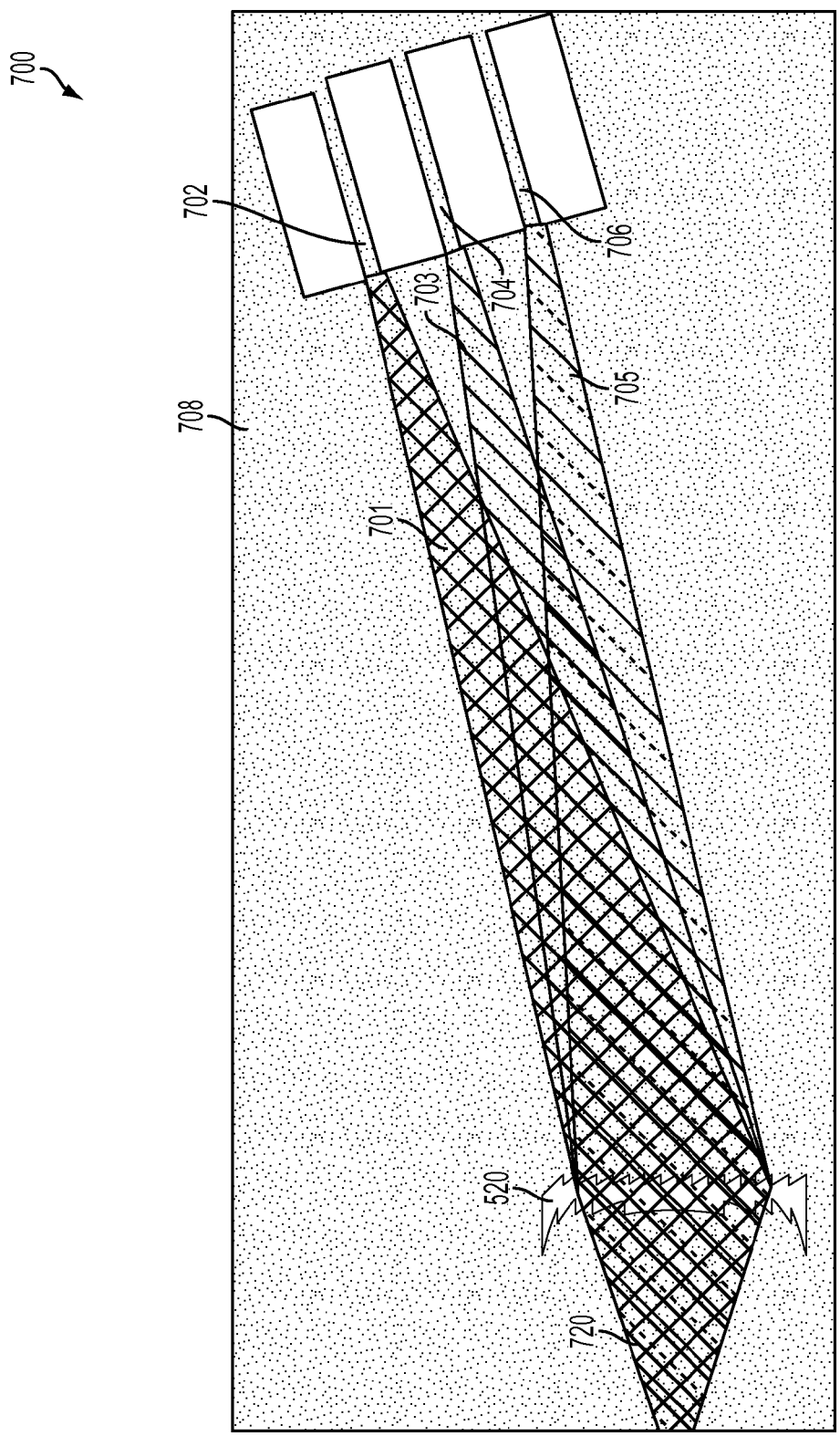
FIG. 7 illustrates an exemplary embodiment of a two-dimensional planar waveguide de-multiplexor.

FIG. 7 illustrates an exemplary embodiment of a two-dimensional planar waveguide de-multiplexor (DMUX) 700. The DMUX 700 includes a lens-prism 520 that is operative to focus and refract a beam 720 having a plurality of channels 701, 703, and 705. Each channel 701, 703, and 705 has a different wavelength, and thus, is refracted to a respective focal point. In the illustrated embodiment, the focal points are aligned with respective waveguide portions 702, 704, and 706 that are operative to guide each respective channel 701, 703, and 705. In an alternate embodiment, the light beam for each channel 701, 703 and 705 may be refracted to a respective point or position such, as for, example, an impingement surface of a photodetector. The DEMUX 700 is patterned in a core material layer 708 that may be arranged on a substrate (not shown).

Figure 8:
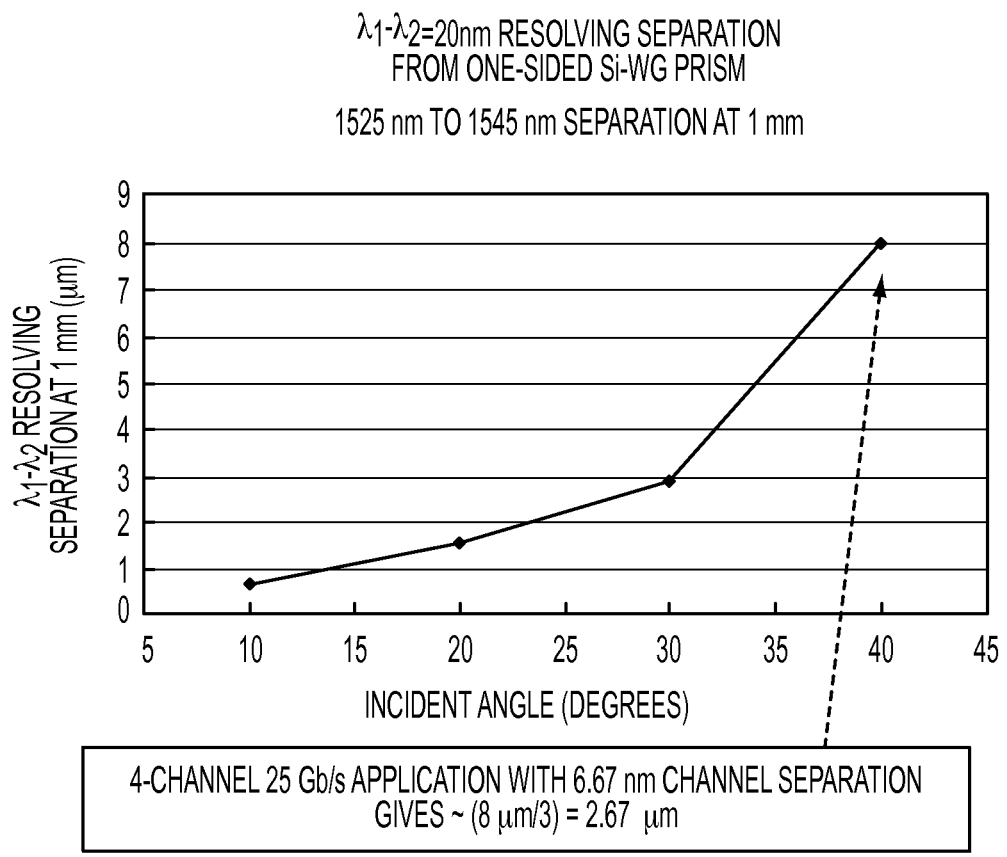
FIG. 8 illustrates a graph showing the resolving power separation of a one-sided SOI planar waveguide prism as a function of the incident angle the light hits the prism wall.

FIG. 8 illustrates a graph showing the resolving power separation of a one-sided SOI planar waveguide prism as a function of the incident angle the light hits the prism wall. This is the separation provided by the refraction of light as it passes through the prism side wall as a function of the defined wavelength separation of light used. The FIG. 8 assumes 4 channels are being used and each channel is separated by ~1.665 nm. It is assumed the light is incident on the first side of the integrated waveguide prism perpendicular to the prism's first wall, and so does not experience any frequency dependent angular path deflection at this point. Then the light hits the second wall of the integrated prism at an angle defined by the x-axis of the plot and becomes refracted, which causes the various wavelengths of light to propagate through the subsequent planar waveguide at different angles. At this point, the farther the different colors propagate in the planar waveguide the wider the separation between of the colors in the planar waveguide. There is essentially a minimum width and separation that can be used for the output waveguides or directly coupled photo-detectors. The combination of the channel wavelength separation in the planar waveguide in conjunction with the minimum waveguide (or detector) width and separation at the focal region of the prism-lens determines the resolving power of the de-multiplexer. FIG. 8 shows that with a single sided prism, an incident angle of 40 degrees, and a propagation length of 1 mm after the refraction induced by the prism, two optical channels whose central wavelengths differ by 1.665 nm will be separated by ~2.67 µm. Many SOI waveguides can have a center-to-center separation of ~1.5 µm without significant coupling between them. So this configuration provides enough de-multiplexer resolving power for this circumstance. The one sided prism example was used to simply convey the principles involved. A two-sided prism will double the resolving power of the integrated prism element. This allows one to reduce the required propagation distance after the prism to 0.5 mm, reduce the required incident angle on the prism side-walls, or double the resolving power of the de-multiplexing structure.

Figure 9:
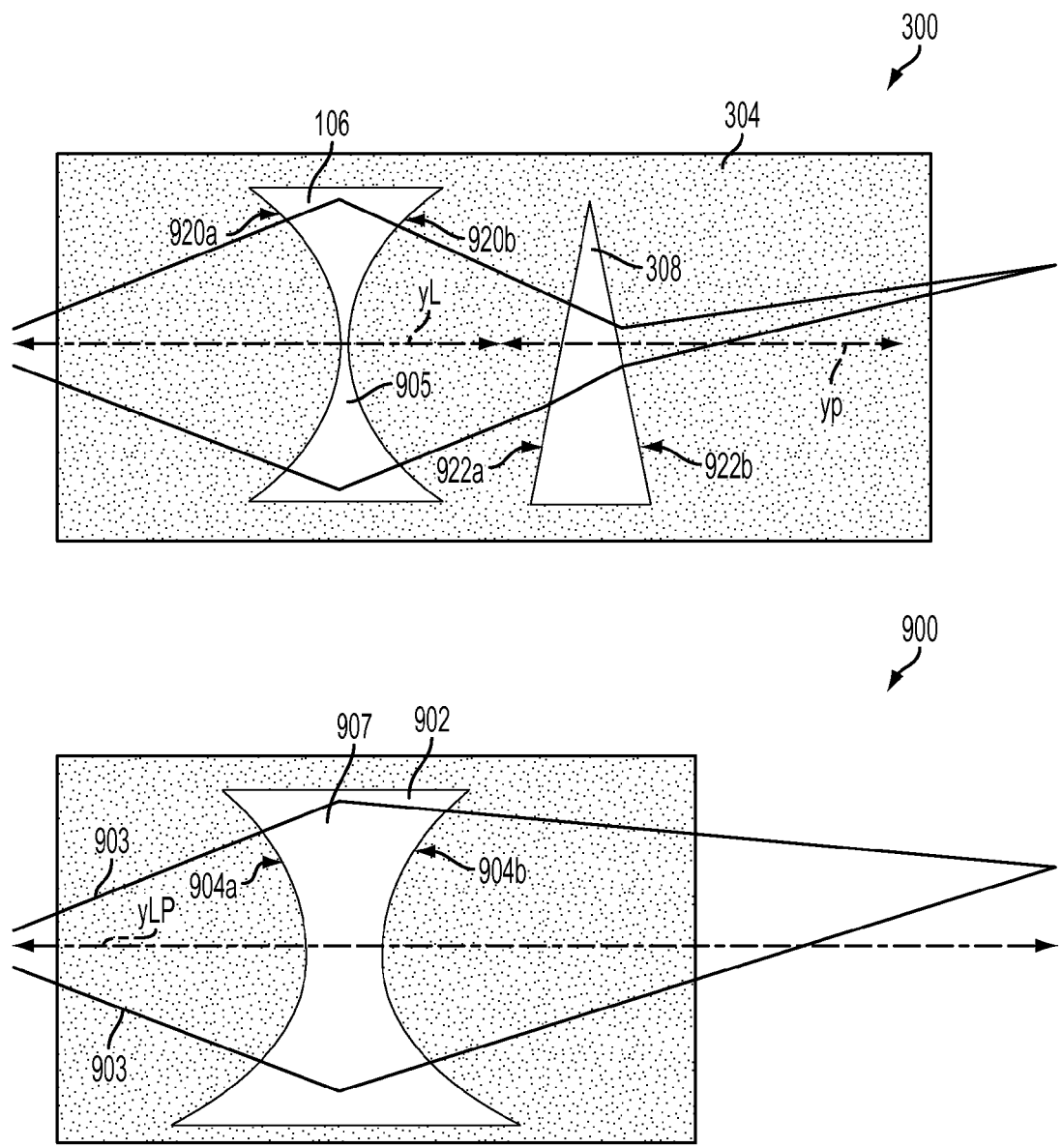
FIG. 9 illustrates an exemplary embodiment of a planar waveguide.

FIG. 9 illustrates an exemplary embodiment of a waveguide 300 that includes a concave lens portion 106 and a prism portion 308 patterned in the core portion 304. The concave surfaces 920a and 920b of the lens portion 106 may be defined by the equation $y_L = ax^2 + b$ where a and b are constants. The distance between the concave surfaces 920a and 920b may be defined by the value of the b constant and partially define a body portion 905. The surfaces 922a and 922b of the prism portion 308 may be defined by the equation $y_P = mx + c$ where m is the slope and c is a constant. FIG. 9 includes an alternate embodiment of a waveguide 900 having a lens-prism 902. The concave surfaces 904a and 904b of the lens-prism 902 may be defined by the equation $y_{LP} = y_L + y_P$. In this regard, the lens-prism 902 behaves similarly to the arrangement of the waveguiding system 300 by focusing and refracting the light beams 903. The waveguiding system 900 may be fabricated and arranged on a substrate in a similar manner as described above. Though each of the opposing concave surfaces 920a and 920b are defined by the same equations in the illustrated embodiment, the opposing concave surfaces 920a and 920b may be dissimilar if desired (e.g., a first surface 920a defined by $y_{L1} = a_1 x^2 + b_1$), and an opposing second surface 920b defined by $y_{L2} = a_2 x^2 + b_2$. The distance between the concave surfaces 904a and 904b may be defined by the value of the b constants and partially define a body portion 907. Likewise, the surfaces 922a and 922b of the prism portion 308 may be dissimilar (e.g., a first surface 922a defined by $y_{P1} = m_1 x + c_1$, and an opposing second surface 922b defined by $y_{P2} = m_2 x + c_2$). In this regard, the opposing concave surfaces 904a and 904b of the lens-prism 902 may be defined by the equations $y_{LP1} = y_{L1} + y_{P1}$ and $y_{LP2} = y_{L2} + y_{P2}$ respectively.

Though the illustrated embodiment includes concave surfaces 920a and 920b of the lens portion 106 substantially defined by quadratic equations, other equations may be used to define the concave surfaces 920a and 920b. For example any suitable power function that defines a substantially parabolic concave surface may be used to define the concave surfaces 920a and 920b. In this regard, chromatic aberration or other optical properties may be accommodated by providing alternative shapes of concave surfaces 920a and 920b.

Figure 10:
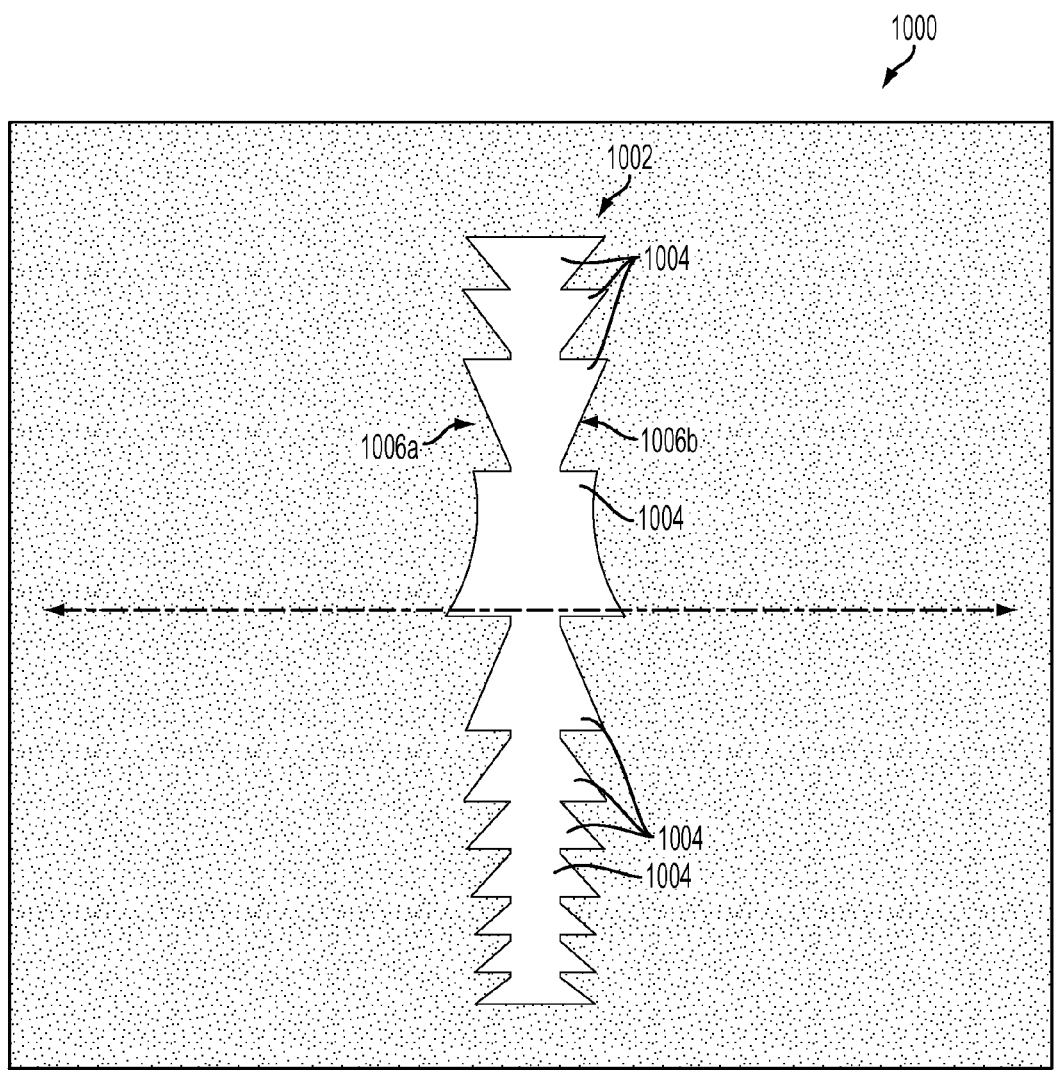
FIG. 10 illustrates an exemplary embodiment of a planar waveguide.

FIG. 10 illustrates an exemplary embodiment of a waveguide 1000 that having a Fresnel lens-prism portion 1002 that may be mathematically derived in a similar manner as the lens-prism 900 described above. In this regard, the opposing concave surfaces 904a and 904b have been arranged as a plurality of Fresnal lens-prism zones 1004 in a similar manner as described above. The surface profile of the surface 1006a and 1006b may be defined by applying a subtraction of a floor function to $y_{LP1}$ and $y_{LP2}$.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An optical waveguide system comprising:
    a substrate;
    a cladding layer arranged on the substrate;
    a core layer arranged on the cladding layer; and
    a lens-prism patterned in the core material, the lens-prism comprising:
        a Fresnel lens portion disposed at an input side of an incident light beam; and
        a Fresnel prism portion disposed at an output side of the incident light beam;
    wherein the Fresnel lens portion is operative to focus the incident light beam and the Fresnel prism portion is operative to refract the focused incident light beam to a point that is off a central lens axis of the lens-prism.

2. The optical waveguide of claim 1, wherein the Fresnel lens portion includes a plurality of Fresnel lens zones.

3. The optical waveguide of claim 2, wherein each Fresnel lens zone of the plurality of Fresnel lens zones includes a concave concentric annular surface and a substantially planar surface arranged substantially in parallel with the central lens axis of the lens-prism.

4. The optical waveguide of claim 1, wherein the Fresnel prism portion includes a plurality of Fresnel prism zones.

5. The optical waveguide of claim 2, wherein each Fresnel prism zone of the plurality of Fresnel prism zones includes a first planar surface arranged substantially parallel to the central lens axis and a second planar surface arranged at an oblique angle relative to the central lens axis of the lens-prism.

6. The optical waveguide of claim 1, wherein the lens-prism includes a first side and a second side opposing the first side, wherein the Fresnel lens portion defines the first side and the Fresnel prism portion defines the second side.

7. The optical waveguide of claim 1, wherein the lens-prism includes a body region defined by a gap between the Fresnel lens portion and the Fresnel prism portion.

8. The optical waveguide of claim 7, wherein the Fresnel lens portion and the Fresnel prism portion extend outwardly in opposing directions from the body region.

9. The optical waveguide of claim 1, wherein the lens-prism is defined by a cavity in the core layer.

10. The optical wave guide of claim 1, wherein the lens-prism is defined by a single cavity in the core layer.

* * * * *